H. E. COFFIN.
TRANSMISSION UNIT FOR MOTOR VEHICLES.
APPLICATION FILED NOV. 6, 1908.
935,643.
Patented Oct. 5, 1909.
2 SHEETS—SHEET 1.
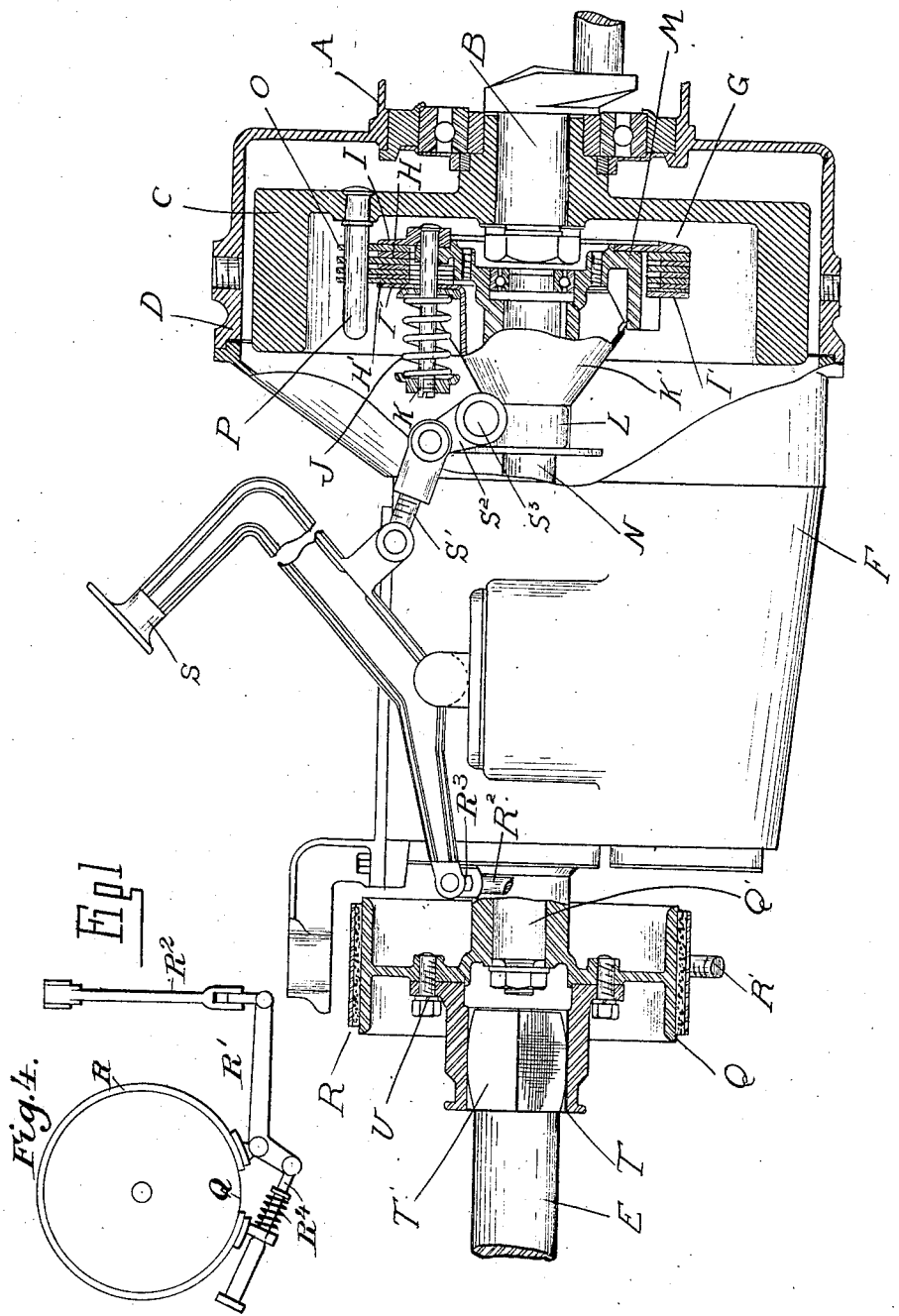
Witnesses
Inventor
Howard E. Coffin

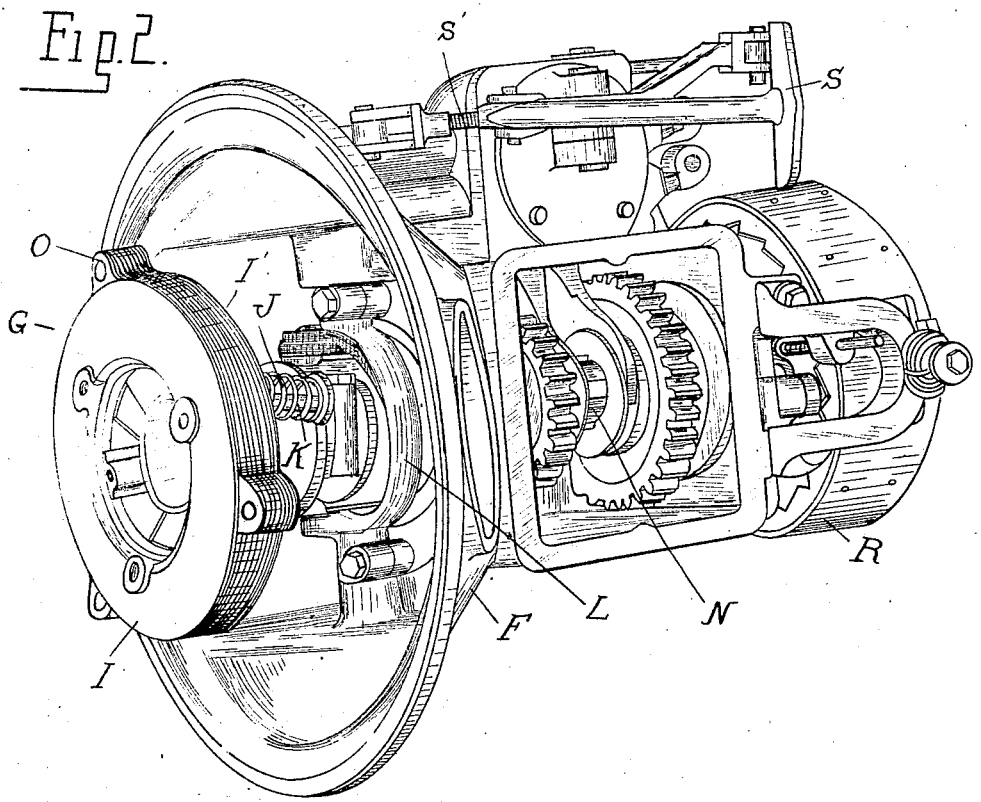
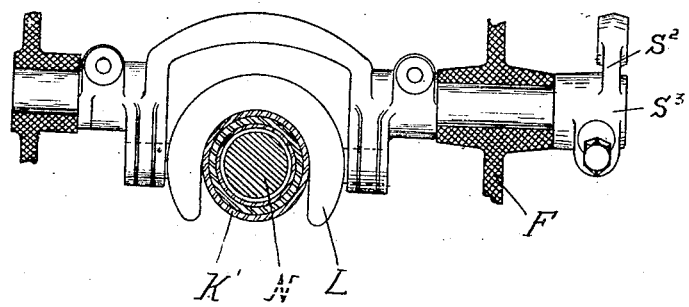

UNITED STATES PATENT OFFICE.

HOWARD E. COFFIN, OF DETROIT, MICHIGAN, ASSIGNOR TO CHALMERS-DETROIT MOTOR COMPANY, OF DETROIT, MICHIGAN, A CORPORATION OF MICHIGAN.

TRANSMISSION UNIT FOR MOTOR-VEHICLES.

935,643.  Specification of Letters Patent.  Patented Oct. 5, 1909.

Application filed November 6, 1908. Serial No. 461,416.

*To all whom it may concern:*

Be it known that I, HOWARD E. COFFIN, a citizen of the United States of America, residing at Detroit, in the county of Wayne and State of Michigan, have invented certain new and useful Improvements in Transmission Units for Motor-Vehicles, of which the following is a specification, reference being had therein to the accompanying drawings.

The invention relates to a power transmission mechanism for automobiles.

It is the particular object of the invention to so organize a mechanism, including the variable speed gearing and the main clutch, that it may be removed and replaced as a unit without dismounting other parts of the machine or disassembling the mechanism itself.

In the drawings—Figure 1 is a sectional side elevation; Fig. 2 is a perspective view of the transmission unit detached; and Fig. 3 is a cross-section showing the clutch-operating mechanism. Fig. 4 is an end elevation of the clutch.

A is the engine casing, B the crank shaft, C the fly wheel, and D an annular extension of the engine casing surrounding the fly wheel.

E is a longitudinal shaft which transmits power to the drive axle (not shown).

Intermediate the engine A and the transmission shaft B is arranged my improved transmission unit, which is constructed as follows: F is a casing which is secured to and supported from the annular housing D for the fly wheel. This casing has mounted therein a variable speed transmission gearing of any suitable construction and at the forward end of this transmission gearing is arranged the main power transmission clutch G. The latter is preferably of the multiple-disk type comprising alternately arranged annular disks H and H', clamping plates I I' at opposite ends of the series, and springs J and bolts K for yieldingly pressing said disks into frictional contact. This yielding pressure is relieved by throwing rearward said clamping plate I', which is actuated by a sleeve K' connected thereto and engaged by an actuating rock arm L. The disks H are keyed to a head M on the driven shaft N, while the disks H' are provided with alined apertured ears O which engage laterally extending drive pins P projecting from the fly wheel C.

The construction of clutch just described is such that it is removable as a unit with the casing F, and is separable from the drive pins P of the fly wheel by an axial movement of the case.

In addition to the transmission gearing and the clutch G the detachable transmission unit has also mounted thereon a brake mechanism. This consists of a brake wheel Q mounted upon the driven shaft Q' of the gearing and a surrounding brake band R. The brake is operated by an actuating lever R' through the medium of the adjustable link R⁴, and the lever R' is operated from a pedal lever S fulcrumed upon the casing F. This pedal lever is employed for the double function of releasing the clutch G and for applying the brake. The clutch operating mechanism consists of a link S' connected to a rock arm S² upon the rock shaft S³ which actuates the rock arm L operating the sleeve K' for releasing the clamping plate I'. The brake is actuated by the same lever through the medium of a link R² connected with the lever R', said link being slotted as at R³ to provide lost motion so as to permit the clutch to be released in advance of the application of the brake.

The connection between the driven shaft Q' and the transmission shaft E is formed through a universal coupling constructed of a polygonal socket T for receiving a correspondingly shaped head T' at the end of the shaft E. The socket T is detachably secured to the wheel Q by suitable means, such as the tap bolts U, and this permits of quickly detaching the shaft E when the transmission unit is to be removed.

With the construction as described in use the whole transmission mechanism may be quickly removed or replaced as a unit by merely detaching the socket T and then detaching the casing F from the annular fly wheel housing D, after which an axial movement outward will disengage the disks H' from their drive pins P. Thus the unit is removed without dismounting any of its parts, with exception of the socket member T.

What I claim as my invention is:

1. In a motor vehicle, the combination with the motor and transmission shaft, of a brake, a transmission variable speed gearing and a main clutch intermediate said motor and transmission shaft, said brake gearing and clutch being organized to be attachable and detachable as a unit from said motor and transmission shaft.

2. In a motor vehicle, the combination with the motor and transmission shaft, of a transmission unit secured to and supported by said motor, said unit comprising a main clutch, a variable speed gearing, an inclosing housing in which said parts are mounted, and a brake without said gearing.

3. In a motor vehicle, the combination with the motor and the transmission shaft, of an intermediate detachable transmission unit comprising a casing secured to and projecting laterally from the motor casing, a transmission gearing and a clutch therein, and a brake without said casing, said clutch having an axially separable driving engagement with said motor and being mounted as an organized unit upon said detachable casing.

4. In a motor vehicle, the combination with the motor and transmission shaft, of an intermediate detachable transmission unit comprising a casing secured to and projecting laterally from said motor casing, a transmission gearing and a clutch within said casing, and a pedal lever and intermediate connections for operating said clutch all mounted upon and removable with said detachable casing.

5. In a motor vehicle, the combination with a motor and transmission shaft, of an intermediate detachable transmission unit comprising a casing supported by and projecting laterally from said motor casing, a transmission gearing and a clutch within said detachable casing, a brake operating upon the driven shaft of said transmission gearing located at the outer end of said casing, a pedal lever fulcrumed upon said casing, and connections operated by said pedal lever for releasing said clutch and applying said brake.

6. In a motor vehicle, the combination with a motor and transmission shaft, of an intermediate detachable transmission unit comprising a casing supported by and projecting laterally from said motor casing, a transmission gearing and a clutch within said casing and a brake for the driven shaft of the transmission gearing without said casing but mounted thereupon, a pedal lever fulcrumed on said casing, and connections for respectively operating said clutch and applying said brake attached to said pedal lever upon opposite sides of the fulcrum thereof.

7. In a motor vehicle, the combination with the motor and transmission shaft, of an intermediate detachable transmission unit comprising a casing supported by and projecting laterally from the motor casing, a transmission gearing and a clutch mounted within and a brake mounted without said casing, a common operating mechanism for said clutch and said brake mounted upon and detachable with said casing, an axially separable drive connection between said clutch and said motor, and a detachable coupling between the driven shaft of said transmission gearing and said transmission shaft.

8. In a motor vehicle, the combination with the motor and the transmission shaft, of an intermediate detachable transmission unit comprising a casing supported by and projecting laterally from the motor casing, a transmission gearing and a clutch mounted within said casing, an axially separable drive connection between said clutch and the motor, a brake head without said casing and secured to the driven shaft of said transmission gearing, and a coupling to said transmission shaft detachably mounted on said brake head.

9. In a motor vehicle, the combination with the motor and the transmission shaft, of a fly wheel for said motor, an annular housing surrounding said fly wheel, a casing secured to and projecting laterally from said annular housing, a transmission gearing within said casing, a clutch mounted upon and detachable with said casing, and projecting into a recess within said fly wheel, a laterally extending drive pin upon said fly wheel engaging one member of said clutch and a detachable coupling between the driven shaft of said transmission gearing and said transmission shaft.

In testimony whereof I affix my signature in presence of two witnesses.

HOWARD E. COFFIN.

Witnesses:
JAMES P. BARRY,
NELLIE KINSELLA.